_(12)_ United States Patent
Kajigai et al.

(10) Patent No.: US 9,365,095 B2
(45) Date of Patent: Jun. 14, 2016

(54) VEHICLE DOOR

(71) Applicant: AISIN SEIKI KABUSHIKI KAISHA, Kariya-shi (JP)

(72) Inventors: Naoki Kajigai, Anjo-shi (JP); Megumi Ishida, Obu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/633,470

(22) Filed: Feb. 27, 2015

(65) Prior Publication Data

US 2015/0246596 A1    Sep. 3, 2015

(30) Foreign Application Priority Data

Feb. 28, 2014 (JP) .................. 2014-038314
Feb. 28, 2014 (JP) .................. 2014-038318

(51) Int. Cl.
*B60J 5/04* (2006.01)

(52) U.S. Cl.
CPC ............. *B60J 5/0433* (2013.01); *B60J 5/045* (2013.01); *B60J 5/0431* (2013.01); *B60J 5/0481* (2013.01)

(58) Field of Classification Search
CPC ....... B60J 5/0431; B60J 5/0433; B60J 5/0481
USPC .......................... 296/146.5; 49/502
See application file for complete search history.

(56) References Cited

U.S. PATENT DOCUMENTS

| | | | |
|---|---|---|---|
| 4,328,642 A * | 5/1982 | Presto | B60J 5/0406 49/502 |
| 4,662,115 A | 5/1987 | Ohya et al. | |
| 5,857,732 A * | 1/1999 | Ritchie | B60J 5/0416 296/146.11 |
| 8,764,099 B2 | 7/2014 | Suzuki | |
| 2009/0165392 A1* | 7/2009 | Totani | B60J 5/0401 49/502 |
| 2015/0191076 A1* | 7/2015 | Schijve | B29C 45/006 296/146.6 |

FOREIGN PATENT DOCUMENTS

| | | | |
|---|---|---|---|
| FR | 2506687 | * | 12/1982 |
| JP | 61-169316 | | 7/1986 |
| JP | 2007-125976 | | 5/2007 |
| JP | 2010-76555 | | 4/2010 |
| JP | 2013-133086 | | 7/2013 |
| JP | 2013-163441 | | 8/2013 |

* cited by examiner

*Primary Examiner* — Dennis H Pedder
(74) *Attorney, Agent, or Firm* — Oblon, McClelland, Maier & Neustadt, L.L.P.

(57) ABSTRACT

A vehicle door swingably attached to a vehicle body via door hinges and able to open and close an opening formed in the vehicle body, includes: an inner panel formed of a resin and having outer and inner surfaces respectively facing outer and inner sides, and in which hinge attaching portions, on which the hinges are attached, and a door lock attaching portion on which a door locking device causing the vehicle door to engage with the vehicle body is attached are formed at different positions from each other; and an outer reinforcement member formed of a resin, arranged on the outer side than the inner panel, having outer and inner surfaces respectively facing the outer and inner sides, coupled to the inner panel, and having a first reinforcement portion facing the door lock attaching portion, a second reinforcement portion continuous with the first reinforcement portion and extending from the first reinforcement portion, and a third reinforcement portion continuous with the second reinforcement portion and facing the hinge attaching portions.

13 Claims, 8 Drawing Sheets

REAR SIDE ← → FRONT SIDE

OUTSIDE ←————————→ INSIDE

VEHICLE DOOR

CROSS REFERENCE TO RELATED APPLICATIONS

This application is based on and claims priority under 35 U.S.C. §119 to Japanese Patent Applications 2014-038314 and 2014-038318, both filed on Feb. 28, 2014, the entire contents of which are incorporated herein by reference.

TECHNICAL FIELD

This disclosure relates to a vehicle door.

BACKGROUND DISCUSSION

Weight reduction of a vehicle door enables fuel efficiency of a vehicle to be improved and further contributes to reduction of CO2 emission from the vehicle. Therefore, technological development of weight reduction of the vehicle door has been promoted. For example, JP 61-169316A and JP 2013-163441 (References 1 and 2) disclose a vehicle door that includes an outer panel formed of a synthetic resin having a lighter weight than metal.

According to References 1 and 2, the vehicle door includes an inner panel and a reinforcement member which are formed of metal and thus, it is not possible to sufficiently reduce weight of the vehicle door. In addition, in a case where the reinforcement member is formed of a resin, there is a concern that rigidity of the vehicle door is lowered.

SUMMARY

Thus, a need exists for a vehicle door which is not suspectable to the drawback mentioned above.

An aspect of this disclosure provides a vehicle door configured to be swingably attached to a vehicle body via a plurality of door hinges and being able to open and close an opening formed in the vehicle body, the vehicle door including: an inner panel which is formed of a resin and has an outer surface facing an outer side and an inner surface facing an inner side, and in which the plurality of hinge attaching portions on which a plurality of door hinges are attached, and a door lock attaching portion on which a door locking device that causes the vehicle door to engage with the vehicle body is attached, are formed at different positions from each other; and an outer reinforcement member which is formed of a resin, is arranged on the outer side than the inner panel, has an outer surface facing the outer side and an inner surface facing the inner side, is coupled to the inner panel, and has a first reinforcement portion facing the door lock attaching portion, a second reinforcement portion that is formed to be continuous with the first reinforcement portion and extends from the first reinforcement portion, and a third reinforcement portion that is formed to be continuous with the second reinforcement portion and faces the plurality of hinge attaching portions.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
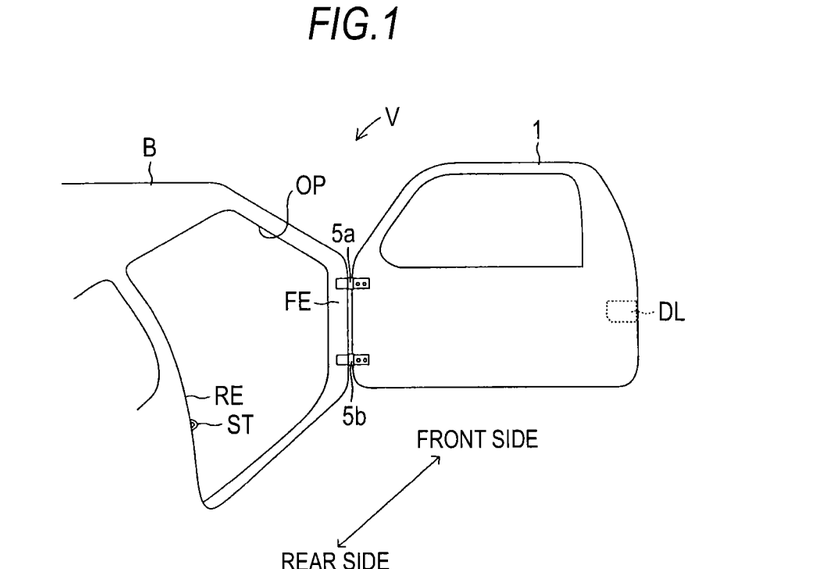
FIG. 1 is a view illustrating a vehicle to which a vehicle door according to an embodiment is attached.

Hereinafter, an embodiment will be described with reference to the accompanying drawings. FIG. 1 is a view illustrating a vehicle V to which a vehicle door 1 according to an embodiment is attached. The vehicle door 1 is attached to a front side of a right surface of the vehicle V. In other words, the vehicle door 1 is attached to a driver seat side of a right hand drive vehicle. However, the embodiment disclosed here can be applied to a vehicle door which is attached to other portions of a vehicle.

An opening OP for getting in/out is formed in a side surface of a vehicle body B, as illustrated in FIG. 1. Two door hinges (an upper door hinge 5a and a lower door hinge 5b) are attached to a front edge FE of the opening OP. The two door hinges are arranged apart from each other in an up-down direction. The upper door hinge 5a is provided above the lower door hinge 5b. Both a hinge shaft of the upper door hinge 5a and a hinge shaft of the lower door hinge 5b extend in the up-down direction. The vehicle door 1 is attached to the vehicle body B through both the upper door hinge 5a and the lower door hinge 5b, such that the vehicle door 1 can allow the opening OP to be open or close and the vehicle door 1 can swing around the hinge shaft. Furthermore, in the strict sense, both the hinge shaft of the upper door hinge 5a and the hinge shaft of the lower door hinge 5b are slightly inclined with respect to the up-down direction.

Figure 2:
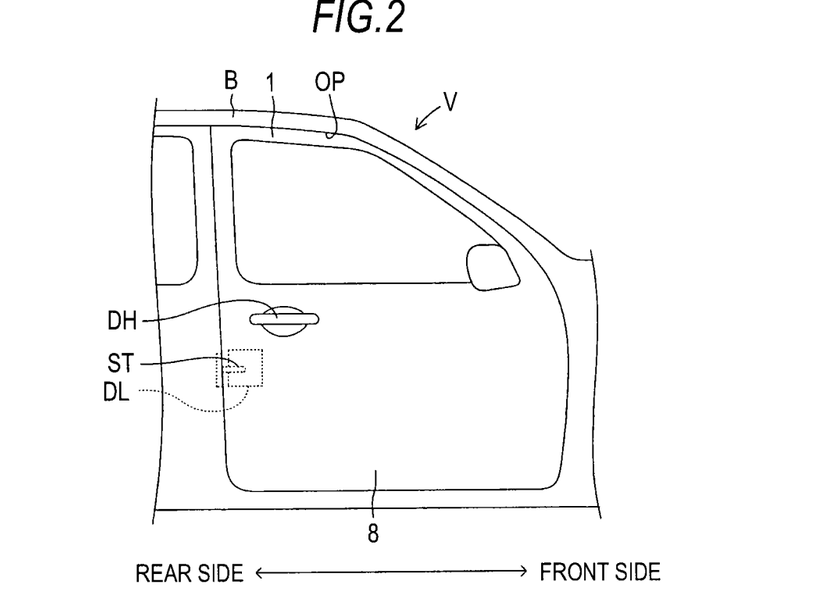
FIG. 2 is a side view of the vehicle door attached to a vehicle body.

FIG. 2 is a side view of the vehicle door 1 attached to the vehicle body B. A door locking device DL is provided in the vehicle door 1, as illustrated in FIGS. 1 and 2. The door locking device DL is a device which allows the vehicle door 1 to be locked to the vehicle body. When the vehicle door 1 is closed, the door locking device DL engages with a striker ST which is provided in a rear edge RE of the opening OP. The door locking device DL engages with the striker ST, in such a manner that the vehicle door 1 is locked to the vehicle body B and the opening OP is closed.

An outer panel 8 is the outermost portion of the components constituting the vehicle door 1. An outer door handle DH is attached to the outer panel 8. The engagement between the door locking device DL and the striker ST is released by operating the outer door handle DH. Accordingly, it is possible to open the vehicle door 1.

Figure 3:
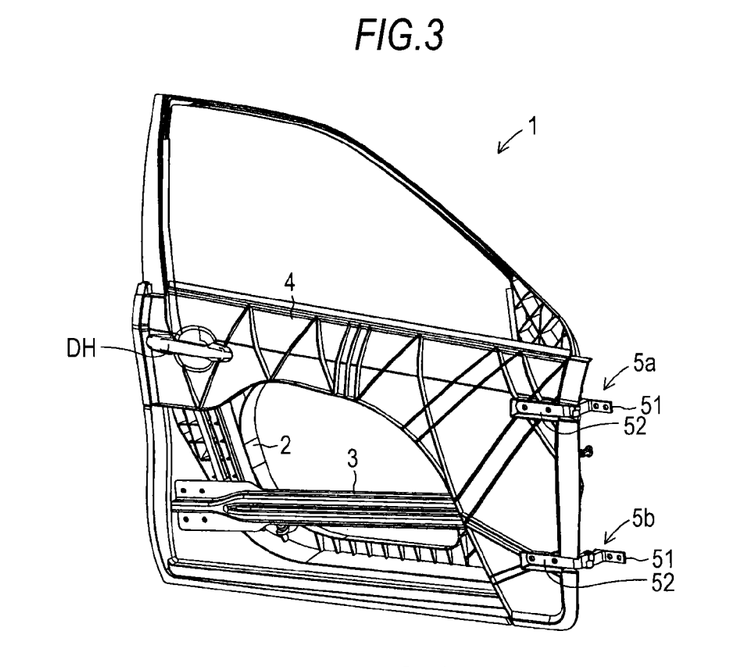
FIG. 3 is a perspective view of the vehicle door when viewed from the outer side.
Figure 4:
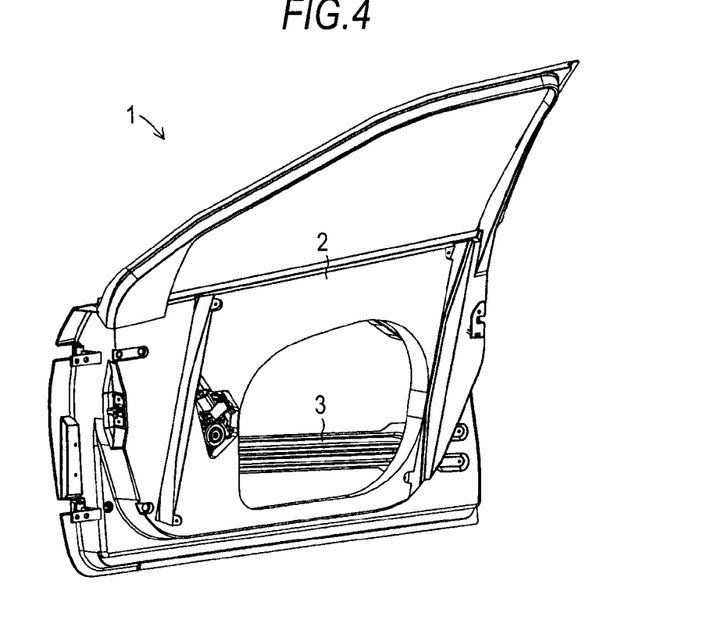
FIG. 4 is a perspective view of the vehicle door when viewed from the inner side.

FIG. 3 is a perspective view of the vehicle door 1 when viewed from the outer side and FIG. 4 is a perspective view of the vehicle door 1 when viewed from the inner side. In FIGS. 3 and 4, the outer panel 8 is not illustrated.

The vehicle door 1 has an inner panel 2, an impact beam 3, an outer reinforcement 4 as an outer reinforcement member, and the door hinges (the upper door hinge 5a and the lower door hinge 5b), as illustrated in FIGS. 3 and 4. The outer reinforcement 4 is located further outside than the inner panel 2. The impact beam 3 is a member which absorbs the impact of a side collision. The impact beam 3 is disposed in a portion between the inner panel 2 and the outer reinforcement 4.

Figure 5:
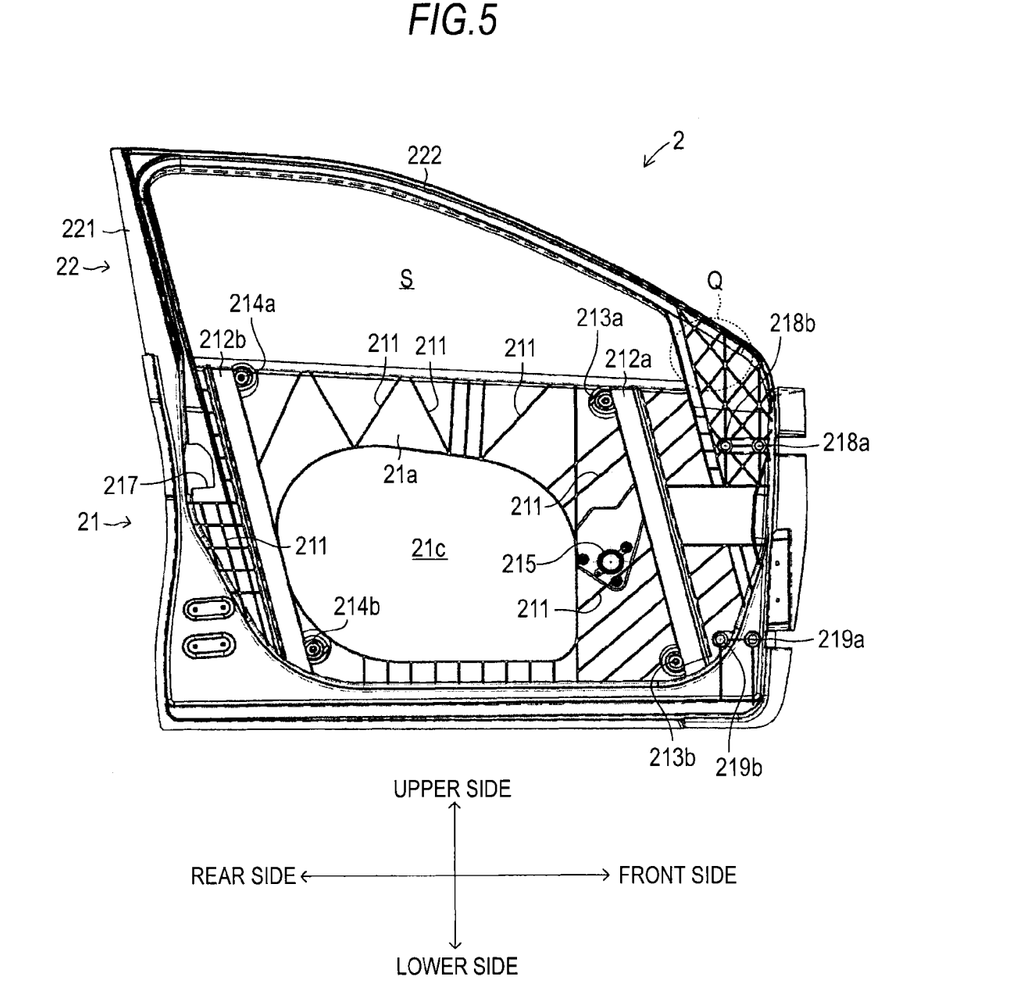
FIG. 5 is a side view of an inner panel when viewed from the outer side.
Figure 6:
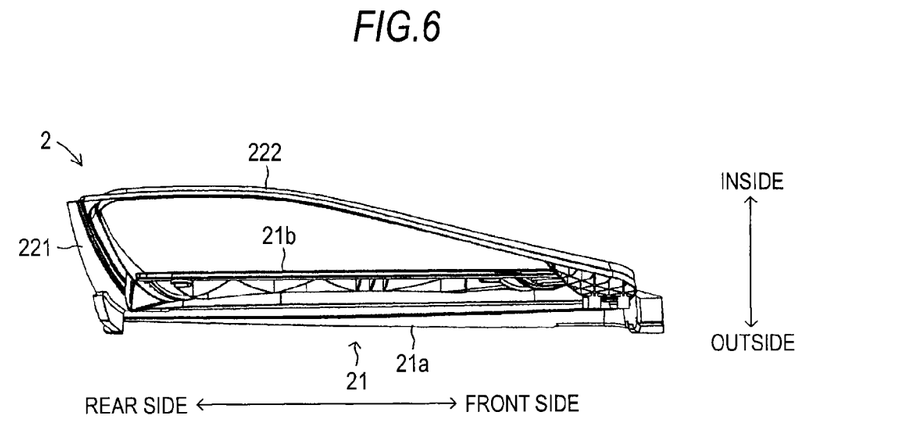
FIG. 6 is a plan view of the inner panel.
Figure 7:
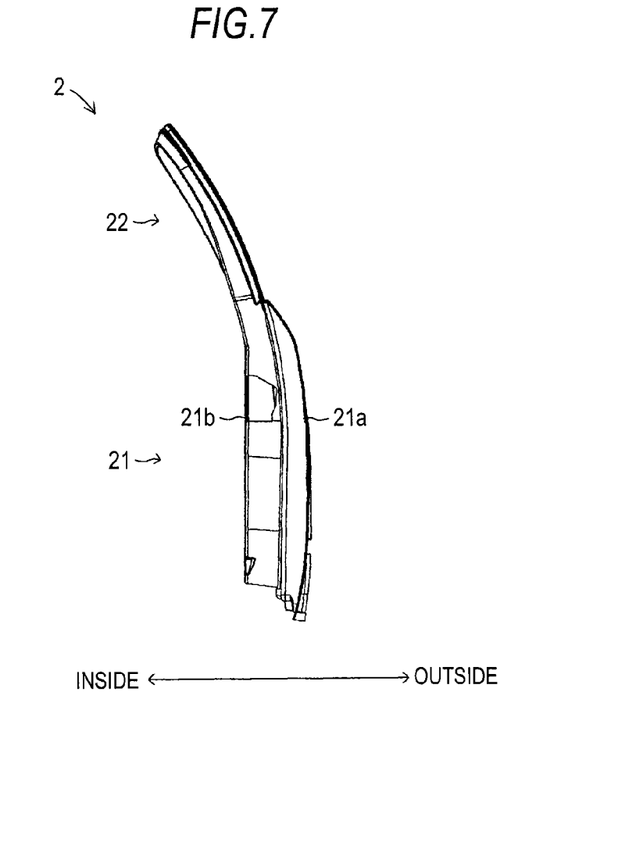
FIG. 7 is a rear view of the inner panel.

FIGS. 5 to 7 are views illustrating the inner panel 2. FIG. 5 is a side view of the inner panel 2 when viewed from the outer side, FIG. 6 is a plan view of the inner panel 2, and FIG. 7 is a rear view of the inner panel 2. In FIG. 5, a rightward direction is a direction leading to a front side (the front side of the vehicle) and a left direction is a direction leading to a rear side (the rear side of the vehicle). The direction leading to the "front side" means a direction leading from a rear portion to a front portion of the vehicle. The direction leading to the "rear side" means a direction leading from the front portion to the rear portion of the vehicle. The inner panel 2 has a main body portion 21 and a frame portion 22 which is provided in the upper portion of the main body portion 21, as illustrated in FIG. 5. The inner panel 2 is formed by injection-molding a thermoplastic resin containing carbon fibers (a thermoplastic carbon fiber reinforced resin). In other words, in the embodiment, an inner panel formed of a fiber reinforced resin is used as a component of the vehicle door 1.

When viewed from the lateral side, the main body portion 21 has a substantially rectangular shape, as illustrated in FIG. 5. A hole 21c having a large size is formed in the center portion of the main body portion 21. In addition, the frame portion 22 has a column portion 221 and an upper portion 222. The column portion 221 stands upward from the rear side of the upper end of the main body portion 21. The upper portion 222 is curved such that the upper portion 222 connects the upper end of the column portion 221 and the front side of the upper end of the main body portion 21. A space S which is surrounded by the column portion 221, the upper portion 222, and the upper end side of the main body portion 21 is closed by a window glass.

The main body portion 21 has an outer surface 21a which faces the outer side of the vehicle and an inner surface 21b (see FIGS. 6 and 7) which faces the inner side of the vehicle. In the embodiment, a direction leading to the "outer side" means a direction leading from the inner side to the outer side of the vehicle, in a width direction of the vehicle. A direction leading to the "inner side" means a direction leading from the outer side to the inner side of the vehicle, in the width direction of the vehicle.

A plurality of ribs stand in the outer surface 21a of the main body portion 21. The plurality of ribs include a plurality of ribs 211 which extend in an oblique direction when viewed from the lateral direction illustrated in FIG. 5. In other words, the plurality of ribs 211 extend in a direction in which the vertical position of each rib 211 linearly changes as the rib 211 extends from the rear side to the front side. The inner panel 2 is reinforced by the plurality of ribs 211 which extend in such an oblique direction. The plurality of ribs 211 form a "truss structure". In other words, the plurality of ribs 211 are arranged in a truss shape, on the outer surface 21a. The "truss shape" means the arrangement of the ribs 211, in which an external force acting on the inner panel 2 is received in an axial direction.

Furthermore, a pair of guide rail portions (a front guide rail portion 212a and a rear guide rail portion 212b) are formed in the outer surface 21a of the main body portion 21. The pair of guide rail portions extend obliquely forward as the guide rail portions extend from the upper end side to the lower end side of the main body portion 21. The front guide rail portion 212a is provided further on the front side than the rear guide rail portion 212b. The pair of guide rail portions (the front guide rail portion 212a and the rear guide rail portion 212b) are parallel to each other.

The shafts of a first front pulley 213a, a second front pulley 213b, a first rear pulley 214a, and a second rear pulley 214b are rotationally supported by the outer surface 21a of the main body portion 21. In addition, a drum 215 is attached the outer surface 21a. The first front pulley 213a is provided in the vicinity of the upper end portion of the front guide rail portion 212a. The second front pulley 213b is provided in the vicinity of the lower end portion of the front guide rail portion 212a. The first rear pulley 214a is provided in the vicinity of the upper end portion of the rear guide rail portion 212b. The second rear pulley 214b is provided in the vicinity of the lower end portion of the rear guide rail portion 212b. The drum 215 is provided in a portion between a front edge of the hole 21c which is formed in the center portion of the main body portion 21 and the front guide rail portion 212a.

Figure 8:
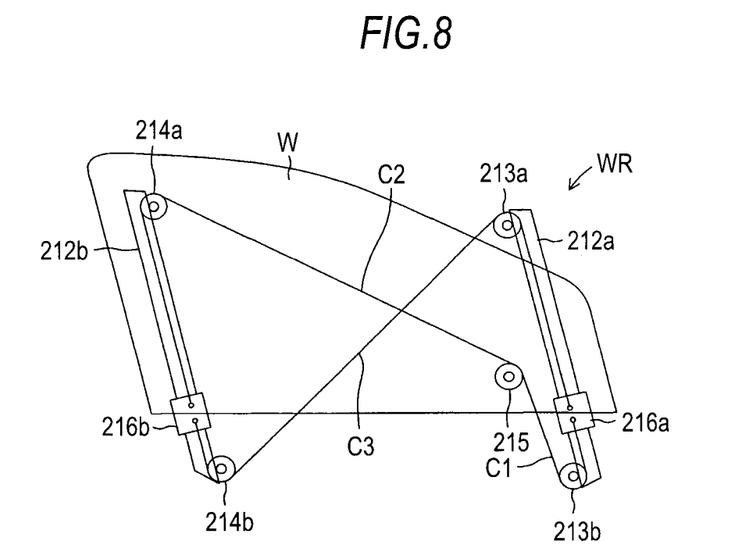
FIG. 8 is a view illustrating the principal configuration of a window regulator device.

Both the front guide rail portion 212a and the rear guide rail portion 212b are members for guiding ascending/descending of the window glass. In other words, both the front guide rail portion 212a and the rear guide rail portion 212b are components of the window regulator device. FIG. 8 is a view illustrating the principal configuration of a window regulator device WR. The window regulator device WR includes the front guide rail portion 212a, the rear guide rail portion 212b, the first front pulley 213a, the second front pulley 213b, the first rear pulley 214a, the second rear pulley 214b, the drum 215, a front fitting portion 216a, a rear fitting portion 216b, a first cable C1, a second cable C2, a third cable C3, and a driving device (not illustrated), as illustrated in FIG. 8.

The front fitting portion 216a is fitted to the front guide rail portion 212a and the rear fitting portion 216b is fitted to the rear guide rail portion 212b. The front fitting portion 216a is fitted to the front guide rail portion 212a, in a state where the front fitting portion 216a can move in a longitudinal direction of the front guide rail portion 212a. The rear fitting portion 216b is fitted to the rear guide rail portion 212b, in a state where the rear fitting portion 216b can move in a longitudinal direction of the rear guide rail portion 212b. The lower end side of a window glass W is fixed to the front fitting portion 216a and the rear fitting portion 216b.

One end of the first cable C1 is locked to the drum 215 and the other is locked to the front fitting portion 216a. The middle portion of the first cable C1 is wound around the second front pulley 213b. One end of the second cable C2 is locked to the drum 215 and the other is locked to the rear fitting portion 216b. The middle portion of the second cable C2 is wound around the first rear pulley 214a. One end of the third cable C3 is locked to the front fitting portion 216a and the other is locked to the rear fitting portion 216b. The middle portion of the third cable C3 is wound around both the first front pulley 213a and the second rear pulley 214b.

When the drum 215 rotates in one direction in accordance with the driving of the driving device (not illustrated), the first cable C1 is wound around the drum 215 and the second cable C2 is fed from the drum 215. Accordingly, both the front fitting portion 216a and the rear fitting portion 216b move downward at the same time, in the longitudinal direction of the guide rail portions 212a and 212b. As a result, the window glass W moves downward. In contrast, when the drum 215 rotates in the other direction, the second cable C2 is wound around the drum 215 and the first cable C1 is fed from the drum 215. Accordingly, both the front fitting portion 216a and the rear fitting portion 216b move upward at the same time, in the longitudinal direction of the guide rail portions 212a and 212b. As a result, the window glass W moves upward. The window glass W moves upward, and thus the space S in the inner panel 2 is closed.

A door-lock attaching concave portion 217 is formed in a rear end portion of the outer surface 21a of the main body portion 21, as illustrated in FIG. 5. The door locking device DL is mounted in the door-lock attaching concave portion 217. The door locking device DL is mounted in the door-lock attaching concave portion 217 and the door locking device DL is fixed to the inner panel 2.

Furthermore, two upper hinge attaching holes 218a and 218b and two lower hinge attaching holes 219a and 219b are formed in a front end portion of the outer surface 21a of the main body portion 21. The upper hinge attaching holes 218a and 218b are formed above the lower hinge attaching holes 219a and the 219b. The two upper hinge attaching holes 218a and 218b are arranged apart from each other in the front-rear direction. Similarly, the two lower hinge attaching holes 219a and 219b are arranged apart from each other in the front-rear direction.

Figure 9:
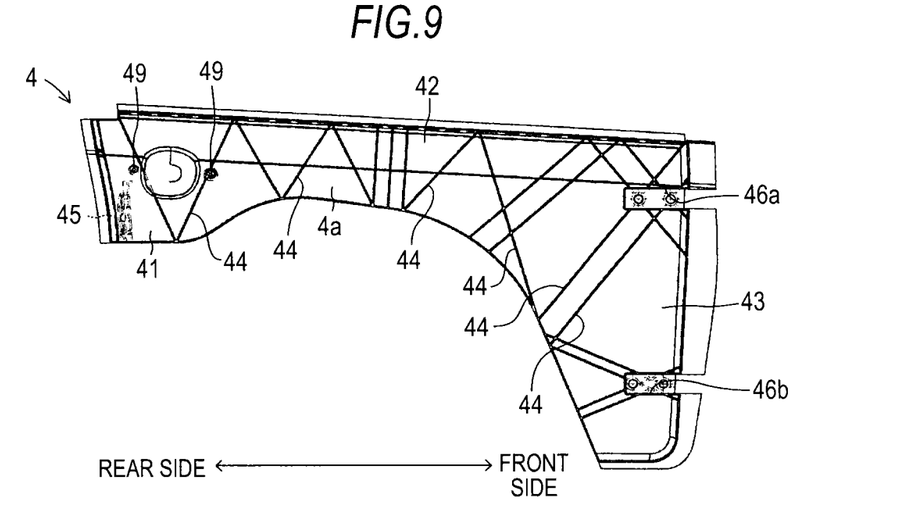
FIG. 9 is a side view of an outer reinforcement when viewed from the outer side.
Figure 10:
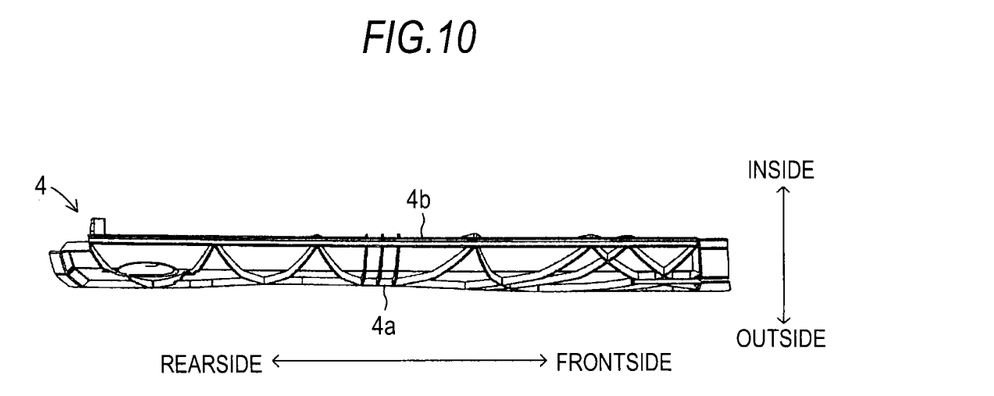
FIG. 10 is a plan view of the outer reinforcement.
Figure 11:
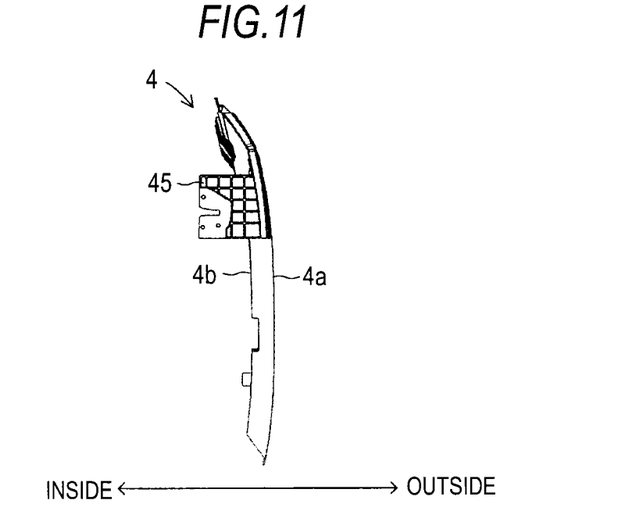
FIG. 11 is a rear view of the outer reinforcement.

FIGS. 9 to 11 are views illustrating the outer reinforcement 4. FIG. 9 is a side view of the outer reinforcement 4 when viewed from the outer side, FIG. 10 is a plan view of the outer reinforcement 4, and FIG. 11 is a rear view of the outer reinforcement 4. In FIG. 9, the rightward direction is a direction leading to the front side and the leftward direction is a direction leading to the rear side. The outer reinforcement 4 functions as a reinforcement member of the inner panel 2 and, further, functions as a reinforcement member of the vehicle door 1. The outer reinforcement 4 of the embodiment is formed by injection-molding a thermoplastic resin containing carbon fibers (a thermoplastic carbon fiber reinforced resin). In other words, in the embodiment, an outer reinforcement formed of a fiber reinforced resin is used as a component of the vehicle door.

The outer reinforcement 4 has an outer surface 4a which faces the outer side of the vehicle and an inner surface 4b (see FIGS. 10 and 11) which faces the inner side opposite to the outer side of the vehicle. The outer reinforcement 4 is located further on the outer side than the inner panel 2 such that the inner surface 4b faces the outer surface 21a of the main body portion 21 of the inner panel 2. The outer reinforcement 4 is joined to the inner panel 2.

The outer reinforcement 4 has a rear reinforcement portion 41 (a first reinforcement portion), a belt line reinforcement portion 42 (a second reinforcement portion), and a front reinforcement portion 43 (a third reinforcement portion), as illustrated in FIG. 9. The rear reinforcement portion 41 forms a rear portion of the outer reinforcement 4. The belt line reinforcement portion 42 is formed connected to the rear reinforcement portion 41. The belt line reinforcement portion 42 extends in the front-rear direction, from the rear reinforcement portion 41 to the front side. The front reinforcement portion 43 forms a front portion of the outer reinforcement 4. The front reinforcement portion 43 is formed connected to the belt line reinforcement portion 42. The front reinforcement portion 43 extends downward in the up-down direction.

When viewed from the lateral side, the outer reinforcement 4 configured as described above has a substantially L shape, as illustrated in FIG. 9.

The rear reinforcement portion 41 faces the door-lock attaching concave portion 217 which is formed on the rear end side of the main body portion 21 of the inner panel 2. The outer reinforcement 4 has a door-lock attaching bracket 45 which extends from the rear reinforcement portion 41 to the inner side, as specifically illustrated in FIG. 11. The door locking device DL which is provided in the door-lock attaching concave portion 217 of the inner panel 2 is assembled to the door-lock attaching bracket 45. Accordingly, the outer reinforcement 4 is joined to the inner panel 2, with both the door-lock attaching bracket 45 and the door locking device DL. When, particularly, the vehicle door 1 is closed, the rear reinforcement portion 41 reinforces a part of the main body portion 21 of the inner panel 2, which is the portion in the vicinity of the portion in which the door locking device DL is attached. In other words, when the vehicle door is closed, the rear reinforcement portion 41 reinforces a part of the main body portion, which is the portion in the vicinity of the door-lock attaching concave portion 217.

The front reinforcement portion 43 faces the upper hinge attaching holes 218a and 218b and the lower hinge attaching holes 219a and 219b which are formed on the front side of the main body portion 21 of the inner panel 2. When, particularly, the vehicle door 1 is open, the front reinforcement portion 43 reinforces a part of the main body portion 21 of the inner panel 2, which is the portion in the vicinity of the upper hinge attaching holes 218a and 218b and the lower hinge attaching holes 219a and 219b. Furthermore, the belt line reinforcement portion 42 which is provided in the portion between the rear reinforcement portion 41 and the front reinforcement portion 43 faces a part of the main body portion 21 of the inner panel 2, which is the portion in the vicinity of the belt line. In other words, the belt line reinforcement portion 42 faces the vicinity of the upper portion of the hole 21c. When the vehicle door 1 is subjected to, particularly, a side collision, the belt line reinforcement portion 42 reinforces the vicinity of the belt line of the vehicle door 1 (the inner panel 2).

Figure 12:
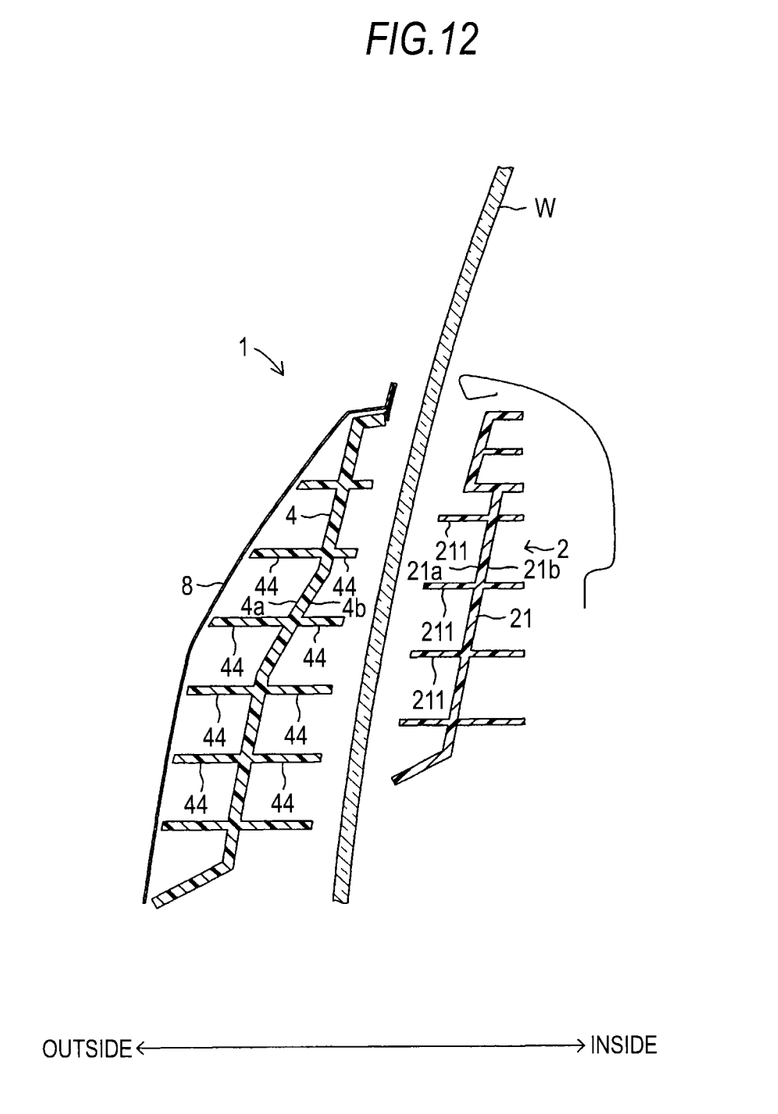
FIG. 12 is a partial cross-sectional view of the vehicle door, in which the vehicle door is cut by a plane perpendicular to a front-rear direction.

FIG. 12 is a partial cross-sectional view of the vehicle door 1 according to the embodiment, in which the vehicle door 1 is cut by a plane perpendicular to the front-rear direction. The outer panel 8 is the outermost portion of the vehicle door 1, as illustrated in FIG. 12. The outer reinforcement 4 is disposed further on the inner side than the outer panel 8. An inner wall surface of the outer panel 8 faces the outer surface 4a of the outer reinforcement 4. The window glass W is disposed in a portion between the inner panel 2 and the outer reinforcement 4.

A plurality of ribs 44 are formed on the outer surface 4a and the inner surface 4b of the outer reinforcement 4. In other words, the plurality of ribs 44 are formed on both surfaces of the outer reinforcement 4. Similarly, the plurality of ribs 211 are formed on the outer surface 21a and the inner surface 21b of the main body portion 21 of the inner panel 2, as can be understood from FIG. 12.

The plurality of ribs 44 in the outer reinforcement 4 extend in a direction in which the vertical position of each rib 44 linearly changes as the rib 44 extends from the rear side to the front side, as illustrated in FIG. 9. The outer reinforcement 4 is reinforced by the plurality of ribs 44 which extend in the oblique direction. The plurality of ribs 44 form a "truss structure". In other words, in the outer surface 4a and the inner surface 4b of the outer reinforcement 4, the plurality of ribs 44 are arranged in a truss shape.

The arrangement positions of the plurality of ribs 44 in the inner surface 4b of the outer reinforcement 4 correspond to the arrangement positions of the plurality of ribs 44 in the outer surface 4a of the outer reinforcement 4, as illustrated in FIG. 12. As a result, the plurality of ribs 44 are provided in a state where the respective ribs 44 extend from the inner surface 4b side to the outer surface 4a side of the outer reinforcement 4. Similarly, the arrangement positions of the plurality of ribs 211 in the inner surface 21b of the main body portion 21 of the inner panel 2 correspond to the arrangement positions of the plurality of ribs 211 in the outer surface 21a of the main body portion 21 of the inner panel 2. As a result, the plurality of ribs 211 are provided in a state where the respective ribs 211 extend from the inner surface 21b side to the outer surface 21a side of the main body portion 21 of the inner panel 2.

Furthermore, a pair of door-handle attaching holes 49 and 49 are formed in the rear reinforcement portion 41 of the outer reinforcement 4, as illustrated in FIG. 9. The outer door handle DH (see FIG. 2) of the vehicle is attached in the pair of door-handle attaching holes 49 and 49. In other words, the outer reinforcement 4 of the embodiment also functions as a support portion (a frame portion) of the outer door handle DH.

In addition, the front reinforcement portion 43 of the outer reinforcement 4 has a pair of hinge fixing portions (an upper hinge fixing portion 46a and a lower hinge fixing portion 46b) which are arranged apart from each other in the up-down direction. The upper hinge fixing portion 46a is formed above the lower hinge fixing portion 46b. The upper hinge fixing portion 46a faces, from the outer side, a portion in the vicinity of the pair of upper hinge attaching holes 218a and 218b in the main body portion 21 of the inner panel 2. The lower hinge fixing portion 46b faces, from the outer side, a portion in the vicinity of the pair of lower hinge attaching holes 219a and 219b in the main body portion 21. The upper door hinge 5a is fixed to the upper hinge fixing portion 46a and the lower door hinge 5b is fixed to the lower hinge fixing portion 46b. The inner panel 2 and the outer reinforcement 4 are fastened to each other by the upper door hinge 5a and the lower door hinge 5b.

Figure 13:
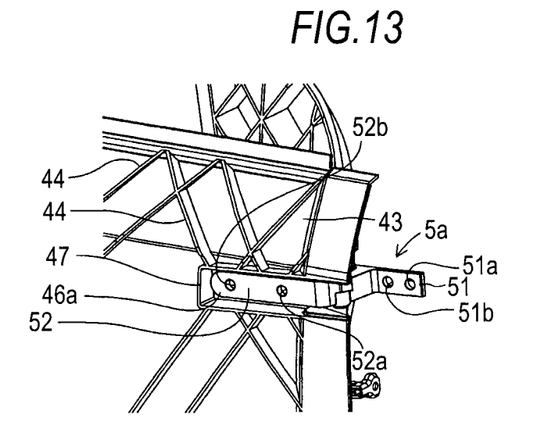
FIG. 13 is a view illustrating a state where an upper hinge is attached to an upper hinge attaching concave portion, when viewed from the outer side.
Figure 14:
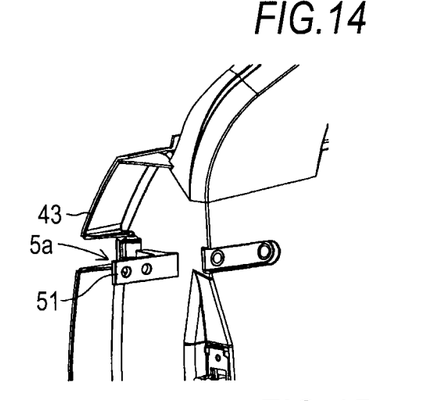
FIG. 14 is a view illustrating a state where the upper hinge is attached to the upper hinge attaching concave portion, when viewed from the inner side.

FIG. 13 is a view illustrating a state where the upper door hinge 5a is fixed to the upper hinge fixing portion 46a, when viewed from the outer side and FIG. 14 is a view illustrating a state where the upper door hinge 5a is attached to the upper hinge fixing portion 46a, when viewed from the inner side. Furthermore, FIG. 15 is a partial cross-sectional view of the vehicle door 1 in a state where the vehicle door 1 is cut by a plane perpendicular to an up-down direction such that the plane passes through the upper door hinge 5a.

Figure 15:
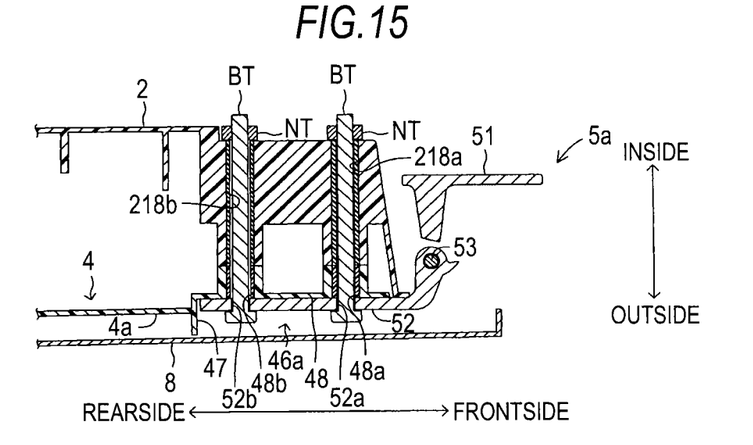
FIG. 15 is a partial cross-sectional view of the vehicle door in a state where the vehicle door is cut by a plane perpendicular to an up-down direction such that the plane passes through the upper hinge.

The upper door hinge 5a includes a first arm 51, a second arm 52, and a hinge pin 53 (see FIG. 15), as illustrated in FIGS. 13 and 15. One end of the first arm 51 and one end of the second arm 52 are swingably connected to the hinge pin 53. Accordingly, the first arm 51 and the second arm 52 are connected in a state where the first arm 51 and the second arm 52 can swing around the hinge shaft (the hinge pin 53). The first arm 51 and the second arm 52 are formed in a long and narrow shape extending in a direction perpendicular to the axial direction of the hinge pin 53. In the first arm 51, two insertion holes 51a and 51b are formed separated from each other in the longitudinal direction. Similarly, in the second arm 52, two insertion holes 52a and 52b are formed separated from each other in the longitudinal direction. In other words, the insertion holes 51a and 51b are formed separated from each other in a direction perpendicular to the axial direction (the up-down direction) of the hinge pin 53. Similarly, the insertion holes 52a and 52b are formed separated from each other in a direction perpendicular to the axial direction (the up-down direction) of the hinge pin 53. The first arm 51 is mounted to the front edge FE of the opening OP for getting in/out, which is formed in the vehicle body B. Fastener members are inserted into the insertion holes 51a and 51b of the first arm 51 which is mounted to the front edge FE. The first arm 51 is connected to the vehicle body B by fixing the inserted fastener members to the front edge FE.

The second arm 52 of the upper door hinge 5a is fixed to the upper hinge fixing portion 46a of the outer reinforcement 4. The upper hinge fixing portion 46a is formed in a long and narrow shape such that the upper hinge fixing portion 46a extends from the front end to the rear side of the front reinforcement portion 43, as illustrated in FIG. 13. The upper hinge fixing portion 46a has a bottom wall 48 and a side wall 47, as illustrated in FIG. 15. The bottom wall 48 extends from the front end to the rear side of the outer surface 4a of the outer reinforcement 4 (the front reinforcement portion 43). The side wall 47 stands outward from the edge portion of the bottom wall 48. The second arm 52 is mounted on the bottom wall 48. In this case, the second arm 52 is mounted on the bottom wall 48, in a state where the insertion holes 52a and 52b in the second arm 52 are arranged apart from each other in the front-rear direction.

In the bottom wall 48, two upper hinge attaching holes 48a and 48b are formed along the front-rear direction (in other words, apart from each other in the front-rear direction), as illustrated in FIG. 15. The two upper hinge attaching holes 48a and 48b concentrically overlap the upper hinge attaching holes 218a and 218b which are formed separated from each other in the front-rear direction, in the front portion of the main body portion 21 of the inner panel 2. In addition, the insertion holes 52a and 52b of the second arm 52 mounted on the bottom wall 48 concentrically overlap the two upper hinge attaching holes 48a and 48b in the bottom wall 48 such that the insertion holes 52a and 52b are arranged along the front-rear direction (in other words, apart from each other in the front-rear direction). Bolt members BT and BT are inserted into the holes which overlap. The bolt members BT and BT are fastened by nut members NT and NT, in such a manner that the upper door hinge 5a (the second arm 52) is fixed to the inner panel 2 and the outer reinforcement 4. The lower door hinge 5b and the upper door hinge 5a have the same structure. The fixation structure of the lower door hinge 5b to the inner panel 2 and the outer reinforcement 4 is the same as that of the upper door hinge 5a to the inner panel 2 and the outer reinforcement 4. Accordingly, the description of the structure of the lower door hinge 5b and the fixation structure of the lower door hinge 5b to the inner panel 2 and to the outer reinforcement 4 will not be repeated.

As described above, the second arm 52 of the upper door hinge 5a and the second arm 52 of the lower door hinge 5b are attached to the upper hinge attaching holes 218a and 218b and the lower hinge attaching holes 219a and 219b of the inner panel 2 via the upper hinge fixing portion 46a and the lower hinge fixing portion 46b of the outer reinforcement 4. Accordingly, the vehicle door 1 (the inner panel 2 and the outer reinforcement 4) is swingably attached to the vehicle body B via the upper door hinge 5a and the lower door hinge 5b.

The vehicle door 1 of the embodiment includes the inner panel 2 formed of a thermoplastic carbon fiber reinforced resin and the outer reinforcement 4 formed of a thermoplastic carbon fiber reinforced resin, as described above. Both the inner panel 2 and the outer reinforcement 4 are formed of a resin lighter than a metal, and thus it is possible to sufficiently reduce the weight of the vehicle door 1. Furthermore, a thermoplastic type resin is used, and thus the cost is reduced, compared to in the case where a thermosetting type resin is used. As a result, the cost is reduced, compared to in the case where a vehicle door is produced using a thermosetting type resin. Alternatively, both the inner panel 2 and the outer reinforcement 4 may be formed of a glass-fiber reinforced resin (GFRP) or a super engineering plastic.

Furthermore, the main body portion 21 of the inner panel 2 has the outer surface 21a facing the outer side and the inner surface 21b facing the inner side. In the front portion of the main body portion 21 of the inner panel 2, the upper hinge attaching holes 218a and 218b (hinge attaching portions) and the lower hinge attaching holes 219a and 219b (hinge attaching portions) are formed separated from each other in the up-down direction. The upper door hinge 5a is attached to the upper hinge attaching holes 218a and 218b and the lower door hinge 5b is attached to the lower hinge attaching holes 219a and 219b. In addition, the door-lock attaching concave portion 217 (a door-lock attaching portion) is formed in the rear portion of the main body portion 21 of the inner panel 2. The door locking device DL is attached to the door-lock attaching concave portion 217.

In addition, the outer reinforcement 4 is disposed further on the outer side than the inner panel 2. The outer reinforcement 4 has the outer surface 4a facing the outer side and the inner surface 4b facing the inner side. The outer reinforcement 4 is joined to the inner panel 2. The outer reinforcement 4 includes the rear reinforcement portion 41 (the first reinforcement portion), the belt line reinforcement portion 42 (the second reinforcement portion), and the front reinforcement portion 43 (the third reinforcement portion). The rear reinforcement portion 41 forms the rear portion of the outer reinforcement 4 and the rear reinforcement portion 41 faces the door-lock attaching concave portion 217. The belt line reinforcement portion 42 is formed connected to the rear reinforcement portion 41. The belt line reinforcement portion 42 extends forward from the rear reinforcement portion 41 and faces the belt line portion of the inner panel 2. The front reinforcement portion 43 is formed connected to the belt line reinforcement portion 42 and forms the front portion of the outer reinforcement 4. The front reinforcement portion 43 extends in the up-down direction such that the front reinforcement portion 43 faces both the portion in the vicinity of the upper hinge attaching holes 218a and 218b and the portion in the vicinity of the lower hinge attaching holes 219a and 219b which are formed in the front portion of the main body portion 21 of the inner panel 2.

According to the embodiment, a part of the inner panel 2, which is the portion in the vicinity of the door-lock attaching concave portion 217, is reinforced by the rear reinforcement portion 41 of the outer reinforcement 4. A part of the vehicle door (the inner panel 2), which is the portion in the vicinity of the belt line is reinforced by the belt line reinforcement portion 42. A part of the inner panel 2, which is the portion in the vicinity of the upper hinge attaching holes 218a and 218b and the lower hinge attaching holes 219a and 219b, is reinforced by the front reinforcement portion 43.

Generally, when a vehicle door is closed, great stress acts on a part of an inner panel of the vehicle door, which is the portion in the vicinity of a portion to which a door locking device is attached. In addition, when the vehicle door is open, great stress acts on a part of the inner panel, which is the portion (the portion having a hinge attached thereto) attached to a vehicle body. Furthermore, when an impulsive force is applied, from the outside, to the vehicle door (a side collision occurs), great stress acts on a part of the vehicle door (the inner panel), which is the portion in the vicinity of the belt line.

The outer reinforcement 4 of the embodiment reinforces the inner panel 2, in relation to the stresses described above. Thus, it is possible to increase the rigidity of the vehicle door 1. The outer reinforcement 4 is formed in a shape connecting the stress concentration portions described above (a portion in the vicinity of the door-lock attaching concave portion 217, a portion in the vicinity of the belt line, a portion in the vicinity of the upper hinge attaching holes 218a and the 218b, and a portion in the vicinity of the lower hinge attaching holes 219a and 219b). Thus, the stresses are much more dispersed, compared to in the case where reinforcement members are separately provided in the respective stress concentration portions. As a result, the rigidity of the vehicle door more increases. Furthermore, a man-hour required for assembling the vehicle door and the manufacturing cost can be reduced, compared to in the case where reinforcement members are separately provided in the respective stress concentration portions.

Furthermore, the outer reinforcement 4 of the embodiment has a substantially L shape. The size of the front side of the outer reinforcement 4 is larger than the rear side thereof. The outer reinforcement 4 covers the upper hinge attaching holes 218a and 218b and the lower hinge attaching holes 219a and 219b which are formed in the main body portion 21 of the inner panel 2. When a vehicle door is produced using the outer reinforcement 4 having such a shape, "the sagging amount of the door" which is an index showing the rigidity of the vehicle door can be reduced.

Furthermore, in the outer reinforcement 4 of the embodiment, the plurality of ribs 44 are arranged in a truss shape. The rigidity of the outer reinforcement 4 is increased by the plurality of ribs 44 arranged in a truss shape. As a result, the rigidity of the vehicle door is also increased. In addition, in the main body portion 21 of the inner panel 2 of the embodiment, the plurality of ribs 211 are arranged in a truss shape. The rigidity of the inner panel 2 is increased by the plurality of ribs 211 arranged in a truss shape. As a result, the rigidity of the vehicle door 1 is also increased. Since the rigidity of the vehicle door 1 is increased as described above, both "the sagging amount of the door" and "the excessive-open amount of the door" as indices showing the rigidity of a vehicle door can be reduced.

"The sagging amount of the door" is the downward displacement amount of the vehicle door when a certain amount of load acts on the rear end of the vehicle door in an open state, from the upper side to the lower side thereof. "The excessive-open amount of the door" is the amount of the displacement of the vehicle door in a direction in which the vehicle door further opens when a certain amount of load acts on the vehicle door in an open state, in a direction in which the vehicle door in an open state further opens. The smaller "the sagging amount of the door" and "the excessive-open amount of the door" are, the higher the rigidity of the vehicle door is.

According to the embodiment, the outer reinforcement 4 has the shape described above and the ribs are provided, in a truss shape, in both the inner panel 2 and the outer reinforcement 4, as described above. Thus, the rigidity of the vehicle door can be sufficiently increased. As a result, even when the inner panel and the outer reinforcement are formed of a resin, it is possible to satisfy the requirement for the rigidity of the vehicle door and, further, it is possible to reduce the weight of the vehicle door.

The plurality of ribs 211 which are arranged, in a truss shape, on the inner panel 2 may be provided in either the outer surface 21a or the inner surface 21b of the main body portion 21 of the inner panel 2. Similarly, the ribs 44 which are arranged, in a truss shape, on the outer reinforcement 4 may be provided in either the outer surface 4a or the inner surface 4b of the outer reinforcement 4. The rigidity of the vehicle door can be sufficiently increased as long as ribs are provided in one surface. However, according to the embodiment, the plurality of ribs 211 and 44 are provided in both surfaces (the outer surface 21a and the inner surface 21b) of the main body portion 21 of the inner panel 2 and both surfaces (the outer surface 4a and the inner surface 4b) of the outer reinforcement 4. The ribs are provided in both surfaces, as described above. As a result, the torsional rigidity of the inner panel 2 and the outer reinforcement 4 can be increased.

Generally, a swing-axis direction (an axial direction of the hinge shaft) of the vehicle door is not a vertical direction of the vehicle body, in the strict sense. The swing-axis direction is slightly inclined with respect to the vertical direction. Accordingly, when a certain amount of load acts on the vehicle door in an open state, from the upper side to the lower side or a certain amount of load acts on the vehicle door in an open state, in a direction in which the vehicle door in an open state further opens, the vehicle door is distorted. However, in the embodiment, the ribs are formed in both surfaces of the inner panel 2 and both surfaces of the outer reinforcement 4, as described above. As a result, the torsional rigidity of the vehicle door is increased. Accordingly, the distortion amount of the vehicle door is reduced, and thus both the sagging amount of the door and the excessive-open amount of the door can be more reduced. As a result, the rigidity of the vehicle door can be much more increased.

In addition, the plurality of ribs 44 are provided in the outer surface 4a of the outer reinforcement 4, and thus the tip end surfaces of the ribs 44 and the inner wall surface of the outer panel 8 face each other, as illustrated in FIG. 12. Accordingly, the outer panel 8 is supported, from the inner side, by the tip end surfaces of the plurality of ribs 44. As a result, the ribs 44 prevent the outer panel 8 from being dented. In other words, the plurality of ribs 44 function as a dent reinforcement of the outer panel 8. As a result, it is not necessary to additionally provide a dent reinforcement dedicated to the outer panel 8. As a result, it is possible to reduce the number of parts of the vehicle door. In addition, a press line for preventing a dent of the outer panel 8 may not be formed in the outer surface of the outer panel 8. Accordingly, it is possible to prevent a reduction in degree of freedom in the design of the outer panel 8, which is caused by a press line. Furthermore, the outer panel 8 can be supported, over the wide range thereof, by the tip end surfaces of the plurality of ribs 44. As a result, a dent of the outer panel 8 can be prevented over a more wide range.

According to the embodiment, the outer reinforcement 4 functions as the support portion (the frame portion) of the outer door handle DH. Thus, it is possible to reduce the number of components of the vehicle door. Furthermore, according to the embodiment, the guide rail portions (the front guide rail portion 212a and the rear guide rail portion 212b) of the window regulator device WR are formed in the outer surface 21a of the main body portion 21 of the inner panel 2. In other words, guide rail portions for guiding ascending/descending of the window glass W are formed in the outer surface 21a. Thus, it is not necessary to additionally provide a guide rail portion. As a result, it is possible to more reduce the number of components of the vehicle door.

In addition, a pair of the door hinges (the upper door hinge 5a and the lower door hinge 5b) fix the outer reinforcement 4 and the inner panel 2. Thus, it is not necessary to additionally provide a member for fixing the outer reinforcement 4 and the inner panel 2. As a result, it is possible to more reduce the number of components of the vehicle door 1.

In addition, the two upper hinge attaching holes 218a and 218b provided on the front side of the main body portion 21 of the inner panel 2 are arranged apart from each other in the front-rear direction. Similarly, the two lower hinge attaching holes 219a and 219b provided on the front side of the main body portion 21 of the inner panel 2 are arranged apart from each other in the front-rear direction. The second arm 52 of the upper door hinge 5a is attached to the two upper hinge attaching holes 218a and 218b and the second arm 52 of the lower hinge 5b is attached to the two lower hinge attaching holes 219a and 219b. At this time, as illustrated in FIG. 13 and FIG. 15, the longitudinal direction of the second arm 52 matches with the frontward-rearward direction. The second arm 52 of the door hinge is connected to both the inner panel 2 and the outer reinforcement 4, at a plurality of positions in the front-rear direction perpendicular to the axial direction of the hinge shaft, as described above. Thus, the rigidity of the door hinge can be increased with respect to rotational moment generated when an external force is applied in a first direction (the up-down direction) parallel to the axial direction of the hinge pin 53 or a certain amount of load acts on the rear end of the vehicle door in, for example, an open state, from the upper side to the down side. Accordingly, for example, the sagging amount of the door, which is an index showing the rigidity of the vehicle door, can be reduced. According to the embodiment, a method of attaching the door hinge to both the inner panel 2 and the outer reinforcement 4 is devised, as described above, and thus the rigidity of the vehicle door 1 can be increased.

The density of ribs in a connection portion Q (the number of ribs per unit area) between the front portion of the main body portion 21 of the inner panel 2 and the front portion of the upper portion 222 of the frame portion 22 is higher than that of ribs in other portion, as illustrated in FIG. 5. Accordingly, the rigidity of the connection portion between the main body portion 21 and the frame portion 22 is increased. As a result, outward deformation of the frame portion 22 due to a suction force at the time of vehicle traveling is effectively prevented.

In addition, the plurality of ribs 211 and 44 are provided on both side surfaces (the outer surface 21a and the inner surface 21b) of the main body portion 21 of the inner panel 2 and on both side surfaces (the outer surface 4a and the inner surface 4b) of the outer reinforcement 4. In this manner, the ribs are provided on both sides and thus, it is possible for the inner panel 2 and the outer reinforcement 4 to possess high torsional rigidity.

In addition, the vehicle door 1 of the embodiment includes the pair of the door hinges (the upper door hinge 5a and the lower door hinge 5b). The pair of the door hinges (the upper door hinge 5a and the lower door hinge 5b) have the first arm 51, the second arm 52, and the hinge pin 53 which connects the first arm 51 and the second arm 52 to be swingable around the axes thereof. The first arm 51 is attached to the vehicle body B and the second arm 52 is fastened to both the inner panel 2 and the outer reinforcement 4 via the bolt BT. That is, the inner panel 2 and the outer reinforcement 4 are together fastened by the door hinges. Thus, the external stress acting on the vehicle door 1 is dispersed to the inner panel 2 and the outer reinforcement 4 and the external stress acting on the inner panel 2 and the external stress acting on the outer reinforcement 4 are mitigated with each other. As a result, even in a case where the inner panel 2 and the outer reinforcement 4 which are formed of a resin having a low rigidity, preferably of a fiber reinforced resin, are used as components of the vehicle door 1, deformation of the inner panel 2 due to the external stress is prevented.

In addition, a direction in which the bolt members BT and BT are inserted into the plurality of the insertion holes 52a and 52b of the second arm 52 is a third direction orthogonal to the first direction (vertical direction) and a second direction (frontward-rearward direction), that is, a vehicle width direction toward the inner side from the outer side as illustrated in FIG. 15. The bolt members BT and BT are inserted in the third direction (vehicle width direction) and thus, it is possible to couple the inner panel 2 and the outer reinforcement 4 arranged in parallel in the third direction.

Hereinbefore, the embodiment disclosed here is described. However, the embodiment disclosed here is not intended to be limited to the embodiment described above. For example, an example in which the vehicle door 1 is swingably connected to the vehicle body B via two hinges is described in the embodiment described above. However, the vehicle door 1 may be swingably connected to the vehicle body B via three or more hinges. In the embodiment, the height of the plurality of ribs which are arranged in a truss shape is approximately 15 mm. However, the height of the ribs can be set to an appropriate value, in accordance with the extent of reinforcement. In the embodiment described above, the vehicle door which can open or close the opening OP for getting in/out, which is formed in the side surface of the vehicle body, is described. However, the embodiment disclosed here can also be applied to a vehicle door, for example, a back door, which is swingably attached to the vehicle body via a hinge. In the embodiment, a sealing member may be provided in a state where the sealing member is interposed between the tip ends of the ribs 44 in the outer surface 4a of the outer reinforcement 4 and the inner wall surface of the outer panel 8. The embodiment disclosed here can be appropriately modified, as long as it does not depart from the spirit of the embodiment disclosed here.

In the vehicle door in the related art described in the BACKGROUND DISCUSSION, the following problems may arise.

The vehicle door includes the inner panel, the outer reinforcement that reinforces the vehicle door arranged on the outer side than the inner panel, and an outer panel arranged on the outer side than the outer reinforcement. Reference 1 discloses a vehicle door that includes, as an outer reinforcement, a belt line reinforcement which reinforces the vicinity of the belt line of the vehicle door, and a door outer reinforcement which reinforces the vicinity of a waistline of the vehicle door.

In recent years, in order to reduce CO2 emission, there are demands for light-weight and thin outer panel of the vehicle door. In a case where the outer panel is thin, there is a concern that the outer surface which is a surface for design of the outer panel is dented. Hence, a measure to prevent the dent is sought. For example, a press line is formed on the outer surface of the outer panel and thereby, an occurrence of the dent on the outer surface of the outer panel is prevented. In addition, a reinforcement (dent reinforcement) which suppresses the outer panel from the inner side of the outer panel is provided in the vehicle door separately from the outer reinforcement and thereby, the occurrence of the dent on the outer surface of the outer panel is prevented.

However, in a case where the press line is formed on the outer surface of the outer panel, a problem arises in that design flexibility of the outer surface of the outer panel is decreased. In addition, in a case where the dent reinforcement of the outer panel is provided in the vehicle door, the number of parts of the vehicle door is increased, thus, the number of assembly processes is increased, and then, a problem arises in that weight of the vehicle door is increased.

According to this disclosure, it is possible to provide a vehicle door that is configured to suppress weight increase of the vehicle door, not to decrease a design flexibility of an outer surface of an outer panel, and to prevent an occurrence of a dent on the outer panel.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle door configured to be swingably attached to a vehicle body via a plurality of door hinges and being able to open and close an opening formed in the vehicle body, the vehicle door comprising:
    an inner panel which is formed of a resin and has an outer surface facing an outer side and an inner surface facing an inner side, and in which a plurality of hinge attaching portions, on which the plurality of door hinges are attached, and a door lock attaching portion on which a door locking device that causes the vehicle door to engage with the vehicle body is attached are formed at different positions from each other; and
    an outer reinforcement member which is formed of a resin, is arranged more toward the outer side than the inner panel, has an outer surface facing the outer side and an inner surface facing the inner side, is coupled to the inner panel, and has a first reinforcement portion facing the door lock attaching portion, a second reinforcement portion that is formed to be continuous with the first reinforcement portion and extends from the first reinforcement portion, and a third reinforcement portion that is formed to be continuous with the second reinforcement portion and faces the plurality of hinge attaching portions,
    wherein a plurality of ribs are arranged on at least one of the outer surface and the inner surface of the outer reinforcement member,
    wherein the plurality of ribs extend in a direction in which a vertical position of each rib linearly changes as each rib extends from a rear side to a front side of the outer reinforcement member, and
    wherein a number of ribs of the third reinforcement portion is larger than a number of ribs of the first reinforcement portion.

2. The vehicle door according to claim 1,
    wherein the plurality of ribs are arranged in a truss shape on at least one of the outer surface and the inner surface of the outer reinforcement member.

3. The vehicle door according to claim 1,
    wherein the plurality of ribs are arranged in a truss shape on the outer surface of the outer reinforcement member, and
    wherein an outer panel arranged on the outer side of the outer reinforcement member is supported by the plurality of ribs arranged on the outer surface.

4. The vehicle door according to claim 2,
wherein a plurality of ribs are arranged in a truss shape on at least one of the outer surface and the inner surface of the inner panel.

5. The vehicle door according to claim 3,
wherein a plurality of ribs are arranged in a truss shape on at least one of the outer surface and the inner surface of the inner panel.

6. The vehicle door according to claim 1,
wherein a handle supporting portion that supports a vehicle outside door handle is formed in the outer reinforcement member.

7. The vehicle door according to claim 1,
wherein a guide rail portion that guides a vertical movement of a vehicle window glass is formed on the inner panel.

8. The vehicle door according to claim 1,
wherein the inner panel and the outer reinforcement member are formed of a fiber reinforced resin.

9. A vehicle door which is configured to be able to open and close an opening formed in a vehicle body, the vehicle door comprising:
an inner panel that has an outer surface facing an outer side and an inner surface facing an inner side;
an outer reinforcement member that is arranged more toward the outer side than the inner panel, has an outer surface facing the outer side and an inner surface facing the inner side, and reinforces the vehicle door; and
an outer panel arranged on the outer side than the outer reinforcement member,
wherein a plurality of ribs are provided on the outer surface of the outer reinforcement member so as to be supported from an inner side of the outer panel, and
wherein the plurality of ribs extend in a direction in which a vertical position of each rib linearly changes as each rib extends from a rear side to a front side of the outer reinforcement member.

10. The vehicle door according to claim 9,
wherein the plurality of ribs formed on the outer surface of the outer reinforcement member are arranged in a truss shape.

11. The vehicle door according to claim 9,
wherein, in the inner panel, a plurality of hinge attaching portions, on which a plurality of door hinges are attached, and a door lock attaching portion, on which a door locking device which allows the vehicle door to be engaged with the vehicle body is attached, are formed at different positions from each other, and
wherein in the outer reinforcement member, a first reinforcement portion facing the door lock attaching portion, a second reinforcement portion that is formed to be continuous with the first reinforcement portion and extends from the first reinforcement portion, and a third reinforcement portion that is formed to be continuous with the second reinforcement portion and faces the plurality of hinge attaching portions are formed.

12. The vehicle door according to claim 9,
wherein the inner panel and the outer reinforcement member are formed of a fiber reinforced resin.

13. The vehicle door according to claim 1, wherein a plurality of ribs are arranged on the second reinforcement portion between the plurality of ribs of the first reinforcement portion and the plurality of ribs of the third reinforcement portion; and
the plurality of ribs of the second reinforcement portion extend in a vertical direction of the vehicle body.

* * * * *